US008884879B2

United States Patent
Lo

(10) Patent No.: US 8,884,879 B2
(45) Date of Patent: Nov. 11, 2014

(54) INPUT DEVICE WITH ADJUSTABLE HOLDING ANGLE AND AN ANGLE ADJUSTING DEVICE THEREOF

(75) Inventor: Jen-Yang Lo, Taoyuan County (TW)

(73) Assignees: Dexin Corporation, Taipei (TW); Thermaltake Technolog Co., Ltd., Taipei (TW)

( * ) Notice: Subject to any disclaimer, the term of this patent is extended or adjusted under 35 U.S.C. 154(b) by 216 days.

(21) Appl. No.: 13/294,319

(22) Filed: Nov. 11, 2011

(65) Prior Publication Data

US 2013/0038533 A1 Feb. 14, 2013

(30) Foreign Application Priority Data

Aug. 12, 2011 (TW) ............................. 100128951 A

(51) Int. Cl.
G06F 3/033 (2013.01)
G09G 5/08 (2006.01)
G06F 3/0354 (2013.01)

(52) U.S. Cl.
CPC .... G06F 3/03543 (2013.01); *G06F 2203/0333* (2013.01)
USPC .......................................................... 345/163

(58) Field of Classification Search
CPC ...... G06F 3/011; G06F 3/0312; G06F 3/0338
USPC .................. 345/156, 161, 163, 164
See application file for complete search history.

(56) References Cited

U.S. PATENT DOCUMENTS

| 6,002,184 | A  | * | 12/1999 | Delson et al. .................... 310/14 |
| 6,169,537 | B1 | * | 1/2001  | Taft ............................... 345/163 |
| 6,486,872 | B2 | * | 11/2002 | Rosenberg et al. ........... 345/161 |
| 6,639,581 | B1 | * | 10/2003 | Moore et al. .................. 345/156 |
| 7,113,171 | B2 | * | 9/2006  | Vayda ............................ 345/167 |
| 7,671,838 | B2 | * | 3/2010  | Large ............................ 345/156 |
| 2003/0074089 | A1 | * | 4/2003 | Onodera ......................... 700/45 |

FOREIGN PATENT DOCUMENTS

TW I294584 12/2007

* cited by examiner

*Primary Examiner* — Quan-Zhen Wang
*Assistant Examiner* — Calvin C Ma
(74) *Attorney, Agent, or Firm* — Li & Cai Intellectual Property (USA) Office

(57) ABSTRACT

An input device with adjustable holding angle and an angle adjusting device thereof are provided. The input device includes a top housing unit, a bottom shell and an angle adjusting device. The angle adjusting device includes a pitching unit and a rolling unit. The pitching unit has a liftable erecting rod, which has a top end connected to the top housing unit. The rolling unit has a transverse rod which is arranged along a lateral direction. The erecting rod has a portion adjacent to its top end, which is rotatably disposed under the top housing unit, and a portion adjacent to its bottom end, which is movably connected to the transverse rod along a transverse direction. Thus, user can adjust the erecting rod to adjust a pitching angle of the top housing unit, or rotate the transverse rod to adjust a rolling angle of the top housing unit.

16 Claims, 9 Drawing Sheets

INPUT DEVICE WITH ADJUSTABLE HOLDING ANGLE AND AN ANGLE ADJUSTING DEVICE THEREOF

BACKGROUND OF THE INVENTION

1. Field of the Invention

The present invention is related to an input device with adjustable holding angle and an angle adjusting device. In particular, the present invention relates to an input device having an angle adjusting device which permits users to adjust holding angle for optimizing ergonomics.

2. Description of Related Art

Computer mouse has been widely used as an input device to control the cursor of computer. However, most of the conventional computer mice are not allowed to adjust the angle of holding posture. The top held portion is fixed, which is not fit to ergonomic.

Since everyone's hands are not the same in shape and size, now user usually is forced to get used to the held portion in a fixed unchangeable holding angle. Over a long period of time, user's wrist is easily to get hurt.

Taiwan patent number 1294584 disclosed a computer mouse of being able to be used in a tilted manner, which includes an upper housing and a lower housing. The upper housing has at least one supporting posts, and two ribs. The lower housing is equipped with micro switches corresponding to the ribs. Each supporting post has an arced top surface, and the lower housing has at least one bolt. The bolt is disposed in the supporting post from the lower housing along an axis of the arced top surface, and the arced top surface is just against the lower housing. The upper housing is also fixed on the lower housing. Therefore, the supporting post can be tilted at an angle related to the lower housing, and the ribs can touch the corresponding micro switches.

The above conventional art cannot make the upper housing to be fixed at a tilted angle related to the lower housing it mainly depends on the force of the user's wrist. Hence, the user's wrist needs to apply additional force and eventually causes another operation burden.

Therefore, it is worth to provide an input device having a means of elevation/depression, which not only can adjust the pitching angle of input device along an erective plane, but also can adjust the tilted angle (or rolling angle) of leftward/rightward along a transverse plane.

SUMMARY OF THE INVENTION

The instant disclosure provides an input device and an angle adjusting device thereof, wherein the angle adjusting device can be used to adjust the pitching angle of elevation/depression and the rolling angle of leftward/rightward rotation of the top holding portion of the input device, so that the input device allows users to make a comfortable holding angle of ergonomics by themselves.

The instant disclosure further provides an input device with adjustable holding angle and an angle adjusting device, which allows users to adjust the angle of the top held portion directly from the outside of the input device, without disassembling the housing of the input device.

In order to achieve the above objectives, the instant disclosure is to provide an input device with adjustable holding angle, which includes a top housing unit, a bottom shell disposed under the top housing unit, and an angle adjusting device. The angle adjusting device is disposed between the top housing unit and the bottom shell, which includes a pitching unit and a rolling unit. The pitching unit has a liftable erective rod, a top end of the erective rod which is connected to the top housing unit. The rolling unit has a lateral rod arranged movably along a transverse direction. A part of the erective rod adjacent to the top end thereof is rotationally arranged under the top housing unit along a horizontal axis perpendicular to the lateral rod. The bottom end of the erective rod is fixedly arranged above the lateral rod.

Therefore, the user can uplift/lower the erective rod to change the height of one end of the top housing unit for adjusting the pitching angle of elevation/depression; and rotate the lateral rod to adjust the rolling angle of the erective rod for adjusting rolling angle of the top housing unit.

In order to achieve the above objectives, the supporting device provided by the instant disclosure further comprises an angle adjusting device, used to adjust a pitching angle and rolling angle of a device, which includes an accommodating housing, a linking module, a pitching unit and a rolling unit. The linking module is pivotally disposed in the accommodating housing along an axis on a horizontal plane. The pitching unit has a erective rod exposed outside the accommodating housing. The erective rod is rotationally connected to the linking module along an erective direction. The rolling unit is horizontally passed through the accommodating housing and connected to a bottom end of the linking module. The rolling unit has a lateral rod arranged along a transverse direction, wherein the lateral rod is movably connected to a bottom end of the linking module.

Thus, the instant disclosure has advantages as follows. The instant disclosure provides an easy adjustment way to adjust the pitching angle of the input device by moving the erective rod of the pitching unit, and to adjust the leftward/rightward tilted angle of the input device by moving the lateral rod of the rolling unit. User can directly from the outside of the input device to change the holding angle fit himself in a comfortable ergonomic condition.

For further understanding of the instant disclosure, reference is made to the following detailed description illustrating the embodiments and examples of the instant disclosure. The description is for illustrative purpose only and is not intended to limit the scope of the claim.

DETAILED DESCRIPTION OF THE PREFERRED EMBODIMENTS

Figure 1:
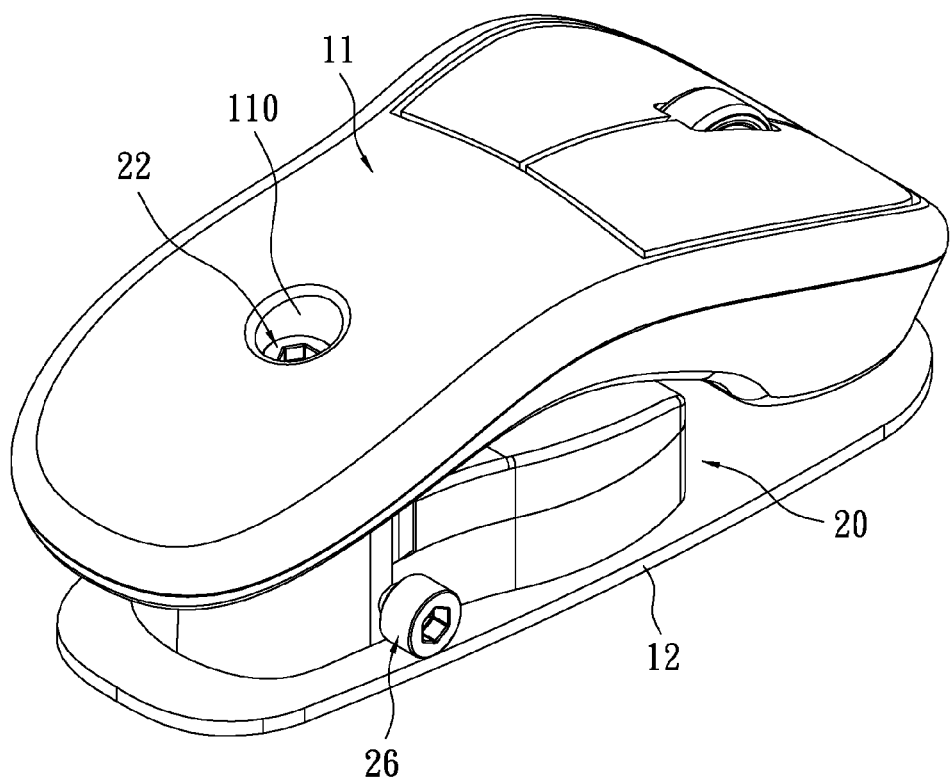
FIG. 1 is a perspective assembled view of an input device with adjustable holding angle according to the instant disclosure.
Figure 2:
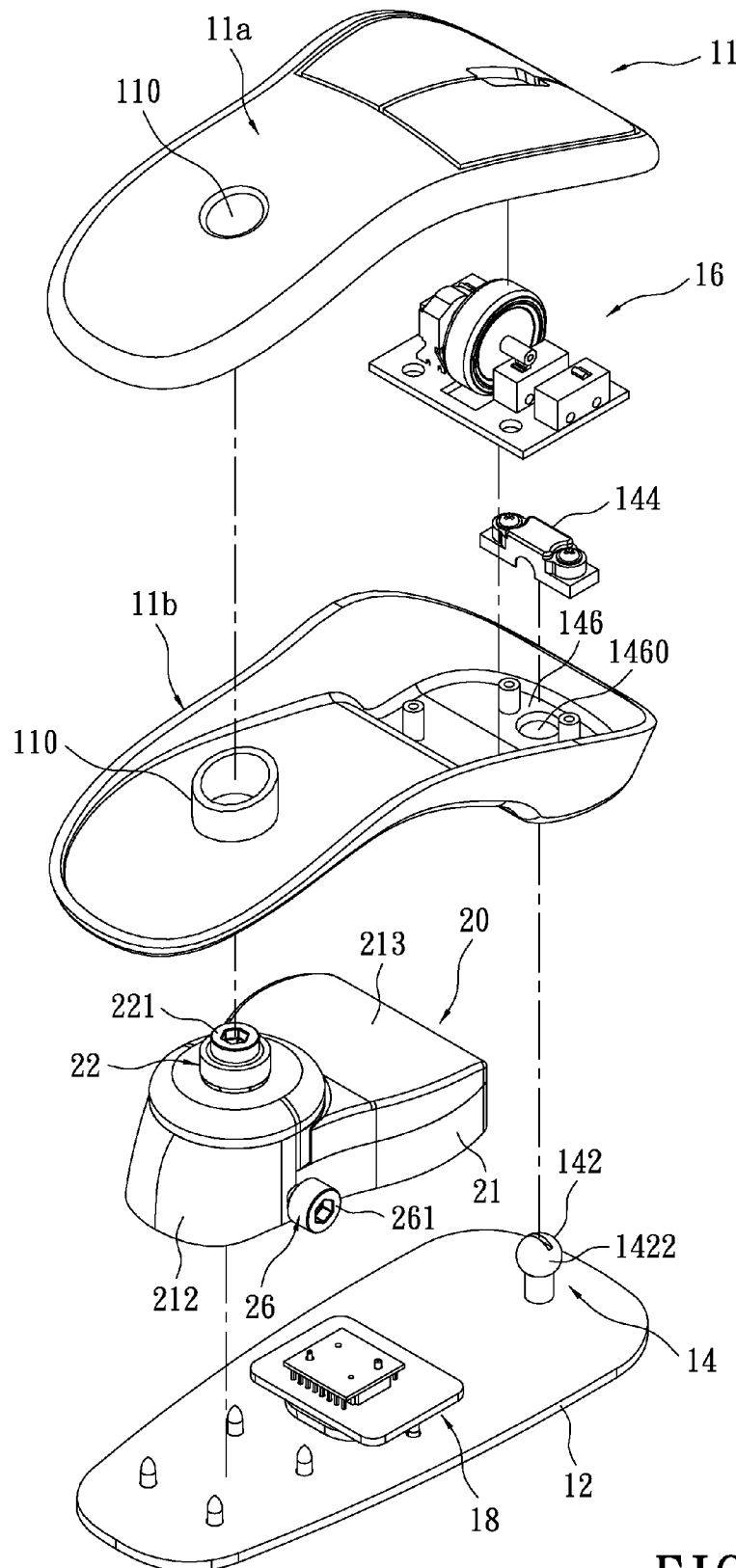
FIG. 2 is a perspective exploded view of the input device with adjustable holding angle according to the instant disclosure.

Reference is made to FIGS. 1 and 2, which are perspective assembled and exploded views of an input device with adjustable holding angle according to the instant disclosure. According to the instant disclosure, a computer mouse is illustrated in this embodiment as an input device 10 with adjustable holding angle that includes a top housing unit 11, a bottom shell 12 and an angle adjusting device 20, which is disposed between the top housing unit 11 and the bottom shell 12. An optical module 18 is disposed on the bottom shell 12 to detect the movement of the input device 10. The holding angle means that the gesture of user's hand when holding the input device, which can divided into a pitching angle of depression/elevation and a rolling angle (or tilted angle) of leftward/rightward along a horizontal surface of the input device 10.

Figure 4:
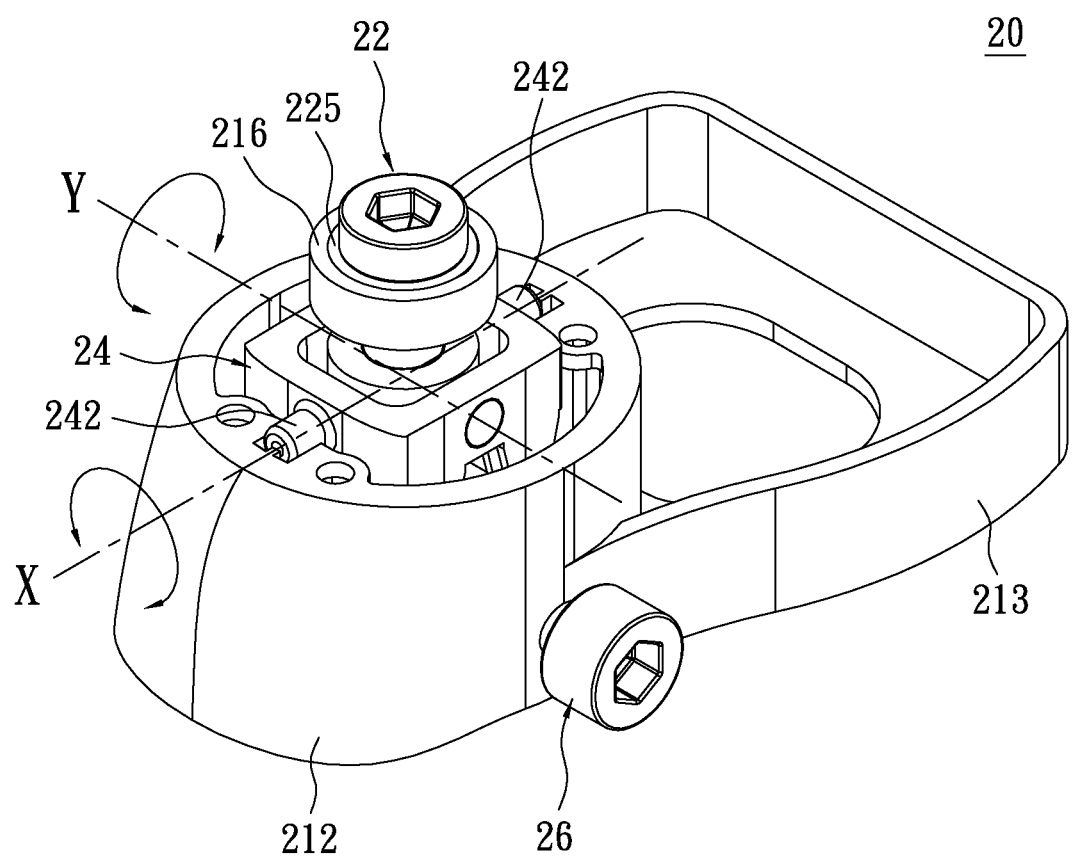
FIG. 4 is a perspective assembled view of an angle adjusting device according to the instant disclosure.

Please refer to FIG. 2. In this instant embodiment, the angle adjusting device 20 is disposed at one end within the input device 10 for adjusting the holding angle. The angle adjusting device 20 includes a pitching unit 22 and a rolling unit 26. The pitching unit 22 has an erective rod 221 being able to uplift, such as a recessed hexagon socket cup head screw as shown in FIG. 2. For describing with reference directions, the bottom shell is defined with a fictitious plane thereon and an erective direction perpendicular to the plane. A longitudinal direction is defined along the plane, which is prarallel to the X axis as shown in FIG. 4, and a transverse direction is defined along the plane, which is prarallel to the Y axis as shown in FIG. 4, perpendicular to the longitudinal direction. The top end of the erective rod 221 connects the top housing unit 11 and is exposed outside the top housing unit 11. The rolling unit 26 has a lateral rod 261, such as a recessed hexagon socket cup head screw as shown in FIG. 2, which is rotationally arranged along the transverse direction. The erective rod 221 is arranged in a swayable manner and has a bottom end which is fixedly arranged above the lateral rod 261. The detail of angle adjusting device 20 will be introduced in following paragraph.

Please refer to FIG. 2. Through the above-mentioned design of the instant disclosure, user can change one end's height of the top housing unit 11 by uplifting/lowering the erective rod 221, so that the pitching angle of the top housing unit 11 can be adjusted. For example, the erective rod 221 of this embodiment is connected to the rear end of the top housing unit 11. When the rear end is uplifted, the top held portion of the input device 10 is forward depressed. When the rear end is lowered, the top held portion of the input device 10 is rearward elevated.

Furthermore, by rotating the lateral rod 261, user can adjust the tilted angle of the erective rod 221 and then the rolling angle of the top housing unit 11 is adjusted. For example, when the lateral rod 261 is rotated leftward, the bottom end of the erective rod 221 which is connected to the lateral rod 261 is moved leftward, and then the top held portion of the input device 10 is tilted rightward. When the lateral rod 261 is rotated rightward, the bottom end of the erective rod 221 which is connected to the lateral rod 261 is moved rightward, and then the top held portion of the input device 10 is tilted leftward.

Figure 3:
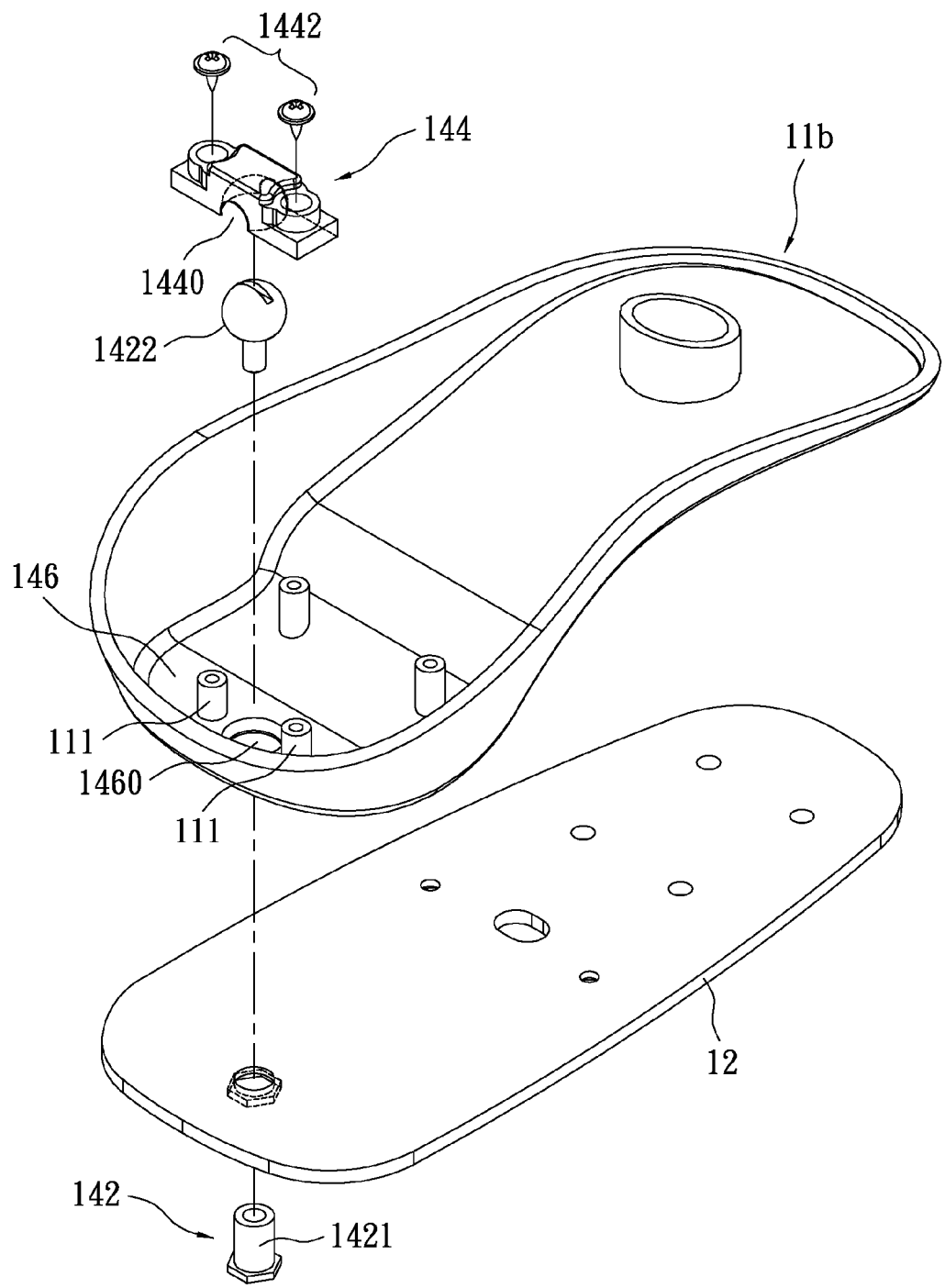
FIG. 3 is a perspective exploded view of an omnidirectional rotating module according to the instant disclosure.

Please refer to FIG. 2 and FIG. 3, the top housing unit 11 of this this embodiment forms a through cylindrical portion 110, and the top end of the erective rod 221 is fixed in the cylindrical portion 110. The top housing unit 11 includes an upper shell 11a and a lower shell 11b which connects the upper shell 11a. As shown in FIG. 2, the cylindrical portion 110 has a part disposed in the upper shell 11a, and some part is disposed in the lower shell 11b.

In this instant disclosure, the input device 10 further includes an omnidirectional rotating module 14, which is opposite to the angle adjusting device 20 and is disposed at the front end of the bottom shell 12. The omnidirectional rotating module 14 has a top end connected to the top housing unit 11. The omnidirectional rotating module 14 is designed for the top housing unit 11, so that the front end of top housing unit 11 can be adjusted corresponding to the adjustment of the angle adjusting device 20. The angle adjusting device 20 can be adjusted by the user actively, and the omnidirectional rotating module 14 is accompanied passively to the angle adjusting device 20.

The omnidirectional rotating module 14 has a supporting rod 142 and an assembling unit 144. The supporting rod 142 has a ball end 1422. The assembling unit 144 has a bottom surface which is recessed with a ball-shaped recess 1440 for connecting rotationally to the top end of the supporting rod 142 and the top housing unit 11.

Please refer to FIG. 2. The input device 10 of this instant embodiment further includes a controlling module 16 which is disposed in the top housing unit 11 and is arranged above the assembling unit 144. The controlling module 16 includes a roller, micro switches, etc., which are ordinary for the computer mouse and not described more here.

Please refer to FIG. 3. The ball end 1422 of the supporting rod 142 passes through the lower shell 11b. The assembling unit 144 is rotationally connected to the ball end 1422 of the supporting rod 142 and the lower shell 11b. In this embodiment, the supporting rod 142 includes a cylindrical post 1421 upward passed through the bottom shell 12 and fixed to the bottom shell 12 by a screw (not labeled). A circular opening 1460 is formed on a front part 146 of the lower shell 11b, through where the ball end 1422 downward passes through the lower shell 11b and is connected to the cylindrical post 1421. The assembling unit 144 covers the ball end 1422 from the upside of the lower shell 11b, and is fixed to bolts 111 on the lower shell 11b by a pair of screws 1442. However the instant disclosure is not limited thereto, for example the front part 146 of the lower shell 11b can be an independent part and is connected to the assembling unit 144.

Figure 5:
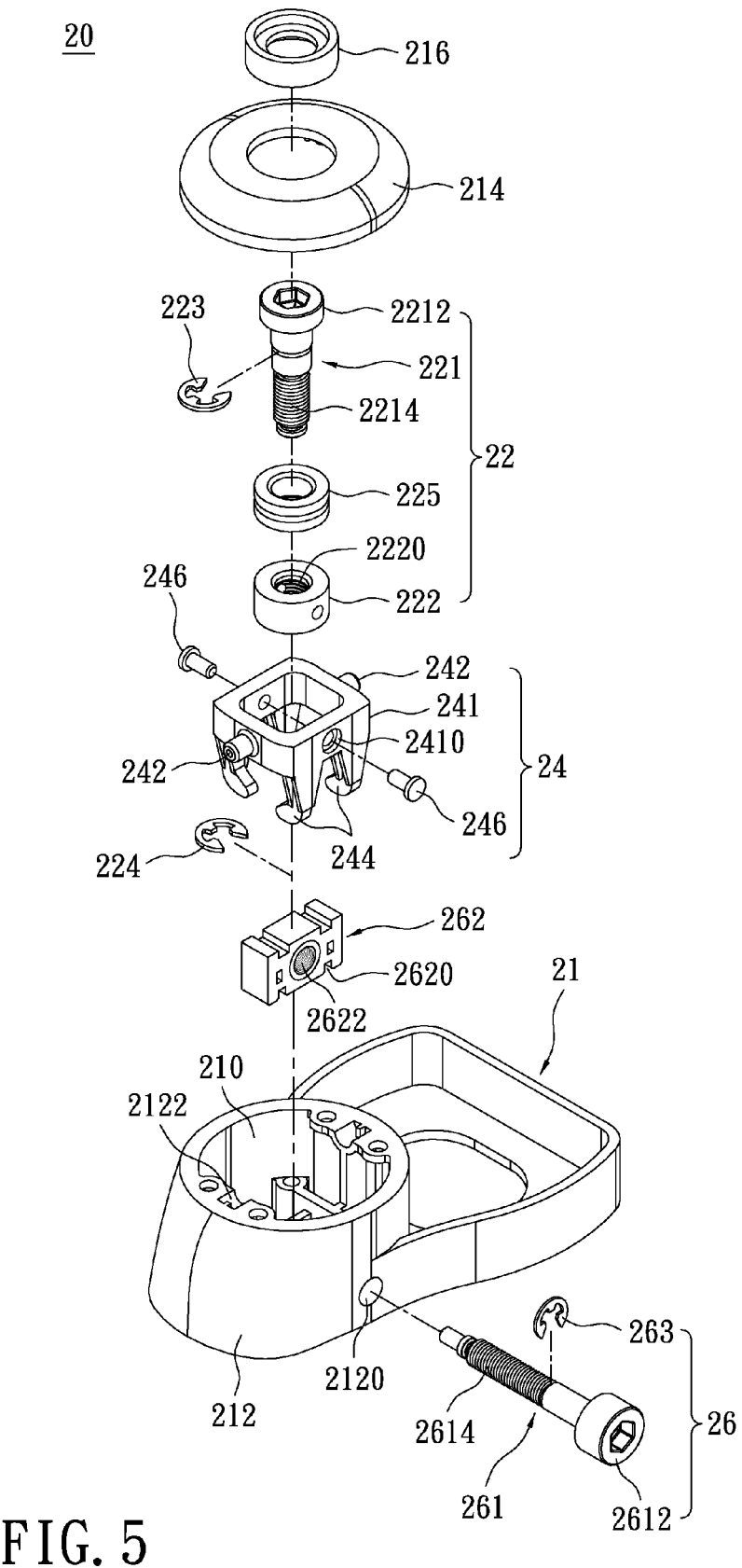
FIG. 5 is a perspective exploded view of the angle adjusting device according to the instant disclosure.

Please refer to FIG. 4 and FIG. 5. The angle adjusting device 20 of this embodiment is described in detail. The angle adjusting device 20 further includes an accommodating housing 21 and a linking module 24 which is disposed in the accommodating housing 21 in swingable manner along the longitudinal direction. The pitching unit 22 is erectly disposed in the linking module 24. The rolling unit 26 horizontally passes through the accommodating housing 21 along the transverse direction and connects to the bottom end of the linking module 24.

The linking module 24 has a frame portion 241 and a pair of pivotal axles 242 extended from two opposite sides of the frame portion 241. The pitching unit 22 is rotationally disposed in the frame portion 241. The accommodating housing 21 includes a base housing 212 and a top cover 214 covered on the base housing 212. The base housing 212 in this embodiment is substantially cylinder-shaped which defined a receiving space 210. A pair of pivotal holes 2122 is formed on the top edge of the base housing 212 to receive the pair of pivotal axles 242. Therefore, one part of the erective rod 221 adjacent to its top end is rotationally arranged under the top housing unit 11 along a horizontal axis perpendicular to the lateral rod 261. For the computer mouse illustrated in this embodiment, the accommodating housing 21 further outwardly extends a extending housing 213 from the base housing 212 to cover the optical module 18. In other word, if the angle adjusting device 20 of the instant disclosure is applied on other devices, the extending housing 213 may be omitted. The base housing 212 is fixed to the bottom shell 12 of the input device 10.

Please refer to FIG. 5. The pitching unit 22 has a thread tube 222 which is fixed in the frame portion 241. The erective rod 221 has a thread portion 2214 screwed to the corresponding thread portion 2220 of the thread tube 222. The pitching unit 22 has a pair of limited clips 223, 224, which is clipped to the erective rod 221 and is located above and under the thread tube 222 respectively, so that the upright displacement of the erective rod 221 is limited. The thread tube 222 is fixed to the thread tube 222 by a pair of screws 246 that pass through two screw holes 2410 formed on two sides of the frame portion 241. Users can use a hex key wrench to adjust the head portion 2212 of the erective rod 221.

Please refer to FIG. 5. In this instant embodiment, to fix the erective rod 221 to the top housing unit 11, a linking cylinder 216 is connected to the cylindrical portion 110 of the top housing unit 11. The linking cylinder 216 preferably is formed integrally with the cylindrical portion 110, or is fixed to the cylindrical portion 110 by other way, such as adhering. The linking cylinder 216 forms a blocking rim from an inner surface. The linking cylinder 216 further has a fixing inner tube 225. The fixing inner tube 225 preferably is fixed in the linking cylinder 216, when the lower shell 11b of the top housing unit 11 is formed by insert-molding ejecting, or by adhering method. During assembling, the erective rod 21 passes through the fixing inner tube 225 from upside to down, and the pitching unit 22 is connected to the top housing unit 11. An assembled perspective view is shown in FIG. 4.

The linking module 24 has a plurality of legs 244 which are extended downwardly from a bottom edge of the frame portion 241. The rolling unit 26 is rotationally connected to the legs 244.

Figure 6:
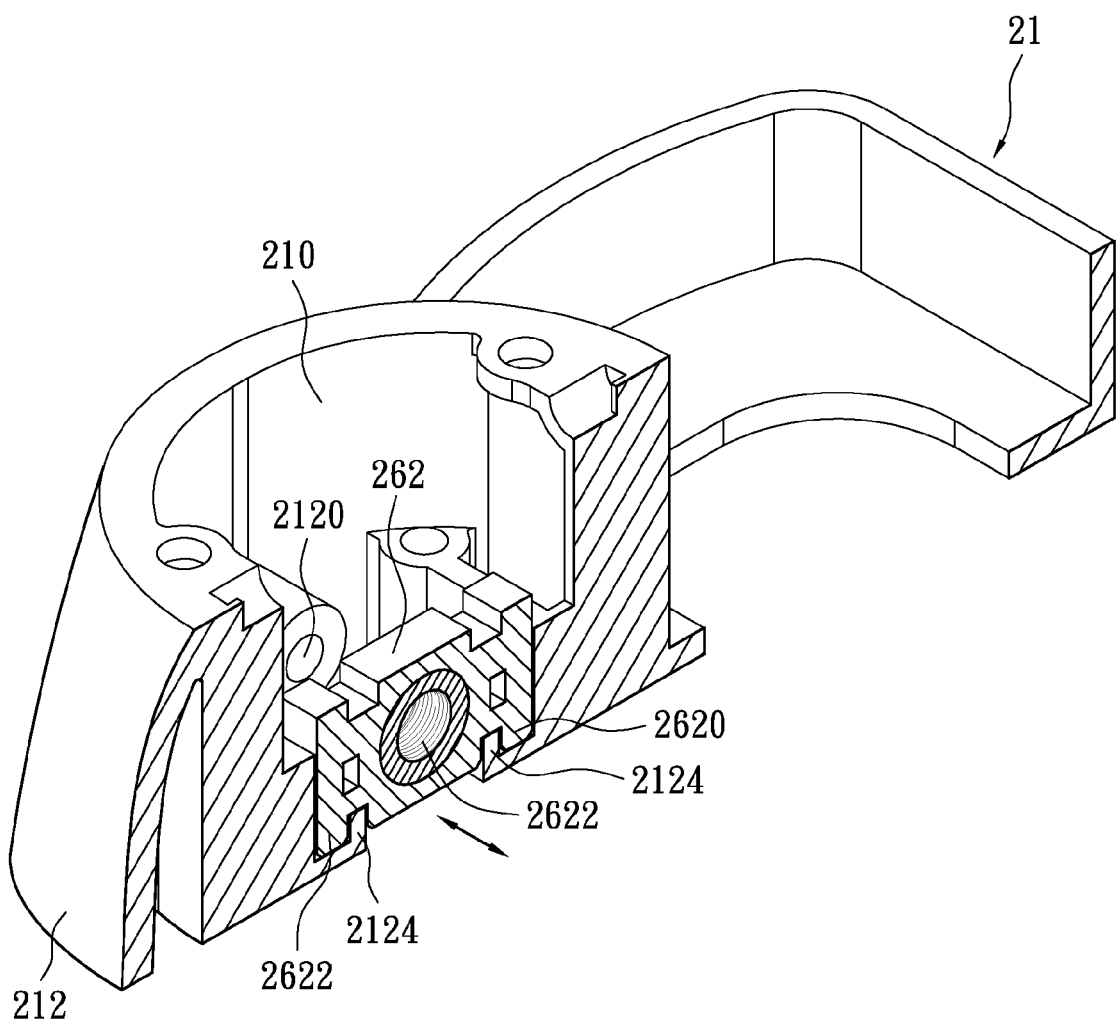
FIG. 6 is a partial cross-sectional view along a vertical plane of the angle adjusting device according to the instant disclosure.

Please refer to FIG. 6 and FIG. 5. The rolling unit 26 has a guiding slider 262, which is screwed on the rolling unit 26 and is fixed to the legs 244 of the linking module 24. The legs 244 clamps tightly two sides of the guiding slider 262, and are located on the rectangular channels as shown in FIG. 5. The central portion of the guiding slider 262 forms a thread portion 2622, and the lateral rod 261 has a thread portion 2614 screwed in the thread portion 2622. The rolling unit 26 has at least one limited clip 263 fixed on the lateral rod 261, so that the displacement of the lateral rod 261 is limited. The bottom end of the erective rod 221 is substantially fixed above the thread portion 262 of the rolling unit 26. Users can use a hex key wrench to rotate the head portion 2612 of the lateral rod 261. The guiding slider 262 of the rolling unit 26 has a pair of track portions 2620, which are formed at the bottom side of guiding slider 262 in this embodiment. The base housing 212 of the accommodating housing 21 forms a pair of rails 2124 corresponding to the track portions 2620. The pair of track portions 2620 is slidably disposed on the pair of rails 2124. However the instant disclosure is not limited thereto. For example, the quantity of the track portion and the rail can be at least one.

Figure 6A:
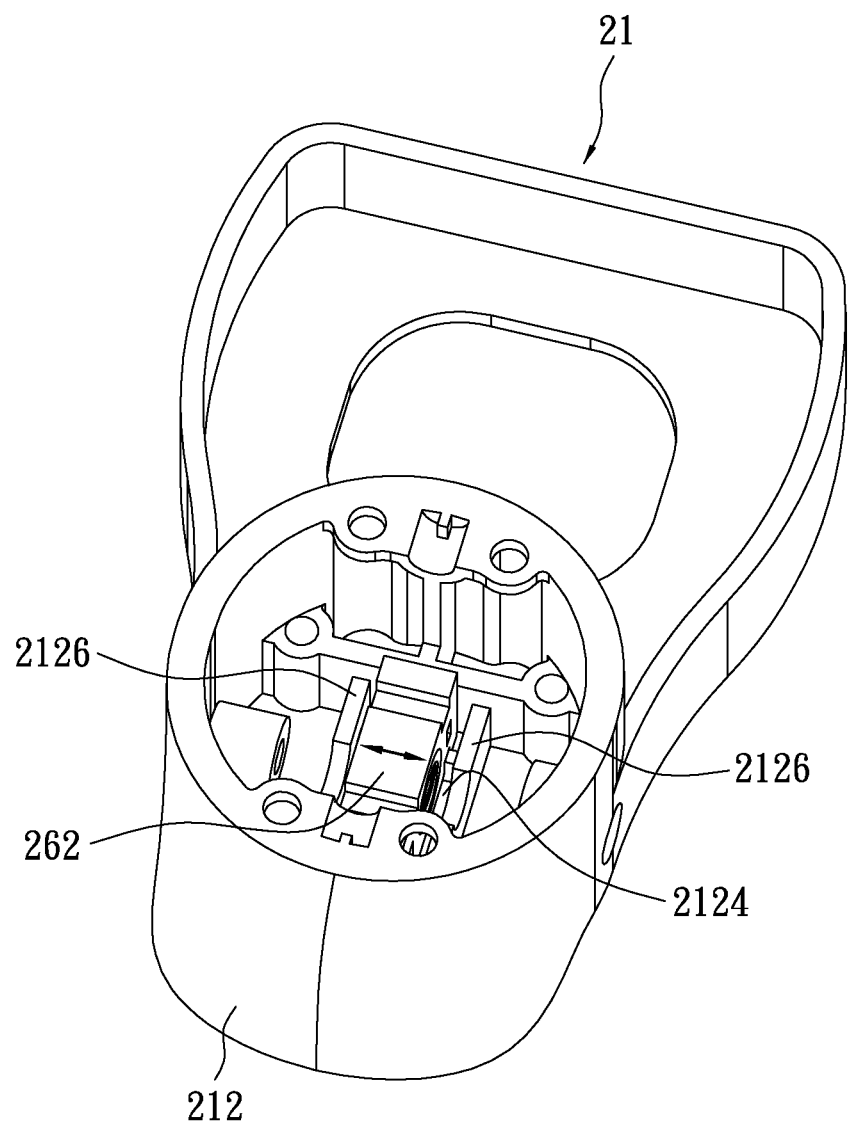
FIG. 6A is a perspective assembled view of the angle adjusting device according to the instant disclosure.

Please refer to FIG. 6A, in which a partial cross-sectional view of the angle adjusting device according to the instant disclosure. In this embodiment, for limiting the displacement of the guiding slider 262, the base housing 212 protrudes upwardly a pair of side blockers 2126, and the guiding slider 262 is disposed between the pair of side blockers 2126.

Please refer to FIG. 5. The base housing 212 of the accommodating housing 21 has a mounting hole 2120 formed through in the transverse direction, which is corresponding to the thread portion 2622 of the guiding slider 262. The lateral rod 261 passes through the mounting hole 2120.

The angle adjusting device 20 of this instant disclosure can be adapted to any device for adjusting the pitching angle and the rolling angle. Similar to the structure of the input device described above, the erective rod 221 of the pitching unit 22 is exposed outside the accommodating housing 21 and is fixed to the device. The pitching unit 22 is erectly disposed in the linking module 24. The rolling unit 26 horizontally passes through the accommodating housing 21 and connects to the bottom end of the linking module 24. The rolling unit 26 has a rotational lateral rod 261 which is disposed along the transverse direction. The erective rod 221 is connected to the lateral rod 261 in a swingable manner. Therefore, users can change one end's height of the device by uplifting/lowering the erective rod 221, so that the pitching angle of the device is adjusted. By rotating the lateral rod 261, the tilted angle of the erective rod 221 is adjusted, and then the rolling angle (tilted angle) of the device is adjusted.

Figure 7A:
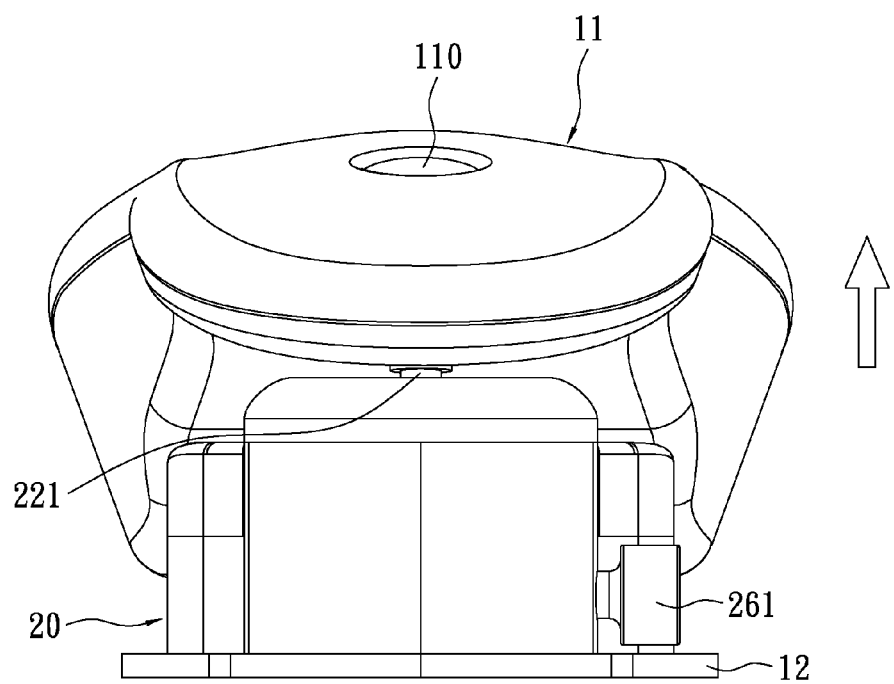
FIG. 7A is a rear view of the input device with adjustable holding angle in an angle of depression according to the instant disclosure.
Figure 7B:
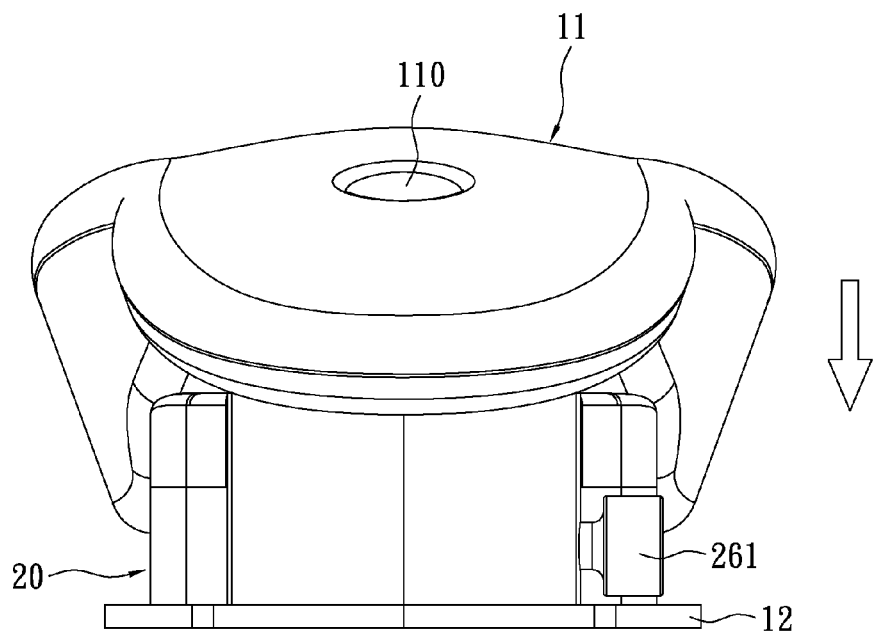
FIG. 7B is a rear view of the input device with adjustable holding angle in an angle of elevation according to the instant disclosure.

The instant disclosure has at least advantages and features as following. As shown in FIG. 7A, FIG. 7B, from the outside of the input device, users can easily to change one end's height of the top housing unit 11 by uplifting/lowering the erective rod 221, and then the pitching angle of the top housing unit 11 is adjustable. As shown in FIG. 7A, when the rear end of the top housing unit 11 is lifted, the top held portion of the input device is depressed forward. As shown in FIG. 7B, when the rear end of the top housing unit 11 is lowered, the top held portion of the input device is elevated rearward.

Figure 8A:
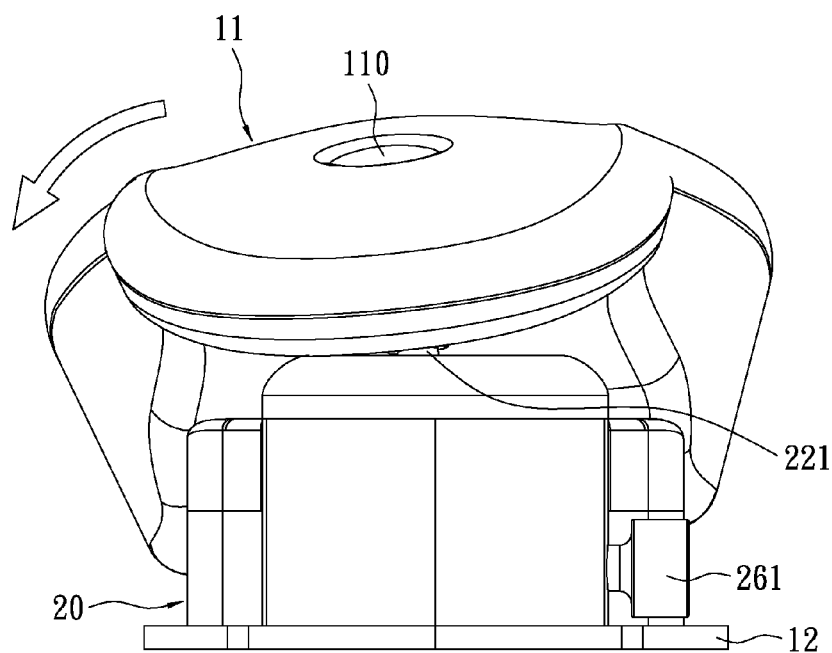
FIG. 8A is a rear view of the input device with adjustable holding angle in leftward tilted angle according to the instant disclosure.
Figure 8B:
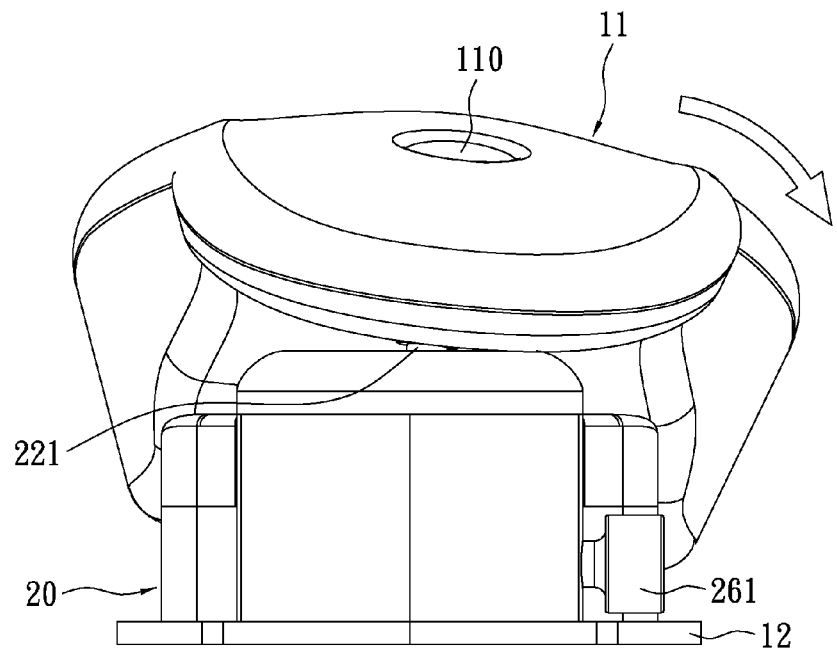
FIG. 8B is a rear view of the input device with adjustable holding angle in rightward tilted angle according to the instant disclosure.

Besides, as shown in FIGS. 8A and 8B, from the outside of the input device, users can easily change the tilted angle of the erective rod 221 by rotating the lateral rod 261, and then the rolling angle (or tilted angle) of the top housing unit 11 is adjusted. As shown in FIG. 8A, when the lateral rod 261 is rotated and moves rightward, the bottom end of the erective rod 221 moves rightward and the top end moves leftward, so that the top held portion of the input device is tilted leftward. As shown in FIG. 8B, when the lateral rod 261 is rotated and moves leftward, the bottom end of the erective rod 221 moves leftward and the top end moves rightward, so that the top held portion of the input device is tilted rightward.

The description above only illustrates specific embodiments and examples of the instant disclosure. The instant disclosure should therefore cover various modifications and variations made to the herein-described structure and operations of the instant disclosure, provided they fall within the scope of the present invention as defined in the following appended claims.

What is claimed is:

1. An input device with adjustable holding angle, comprising:
a bottom shell, defining a plane thereon and an erective direction perpendicular to the plane, wherein a longitudinal direction and a transverse direction perpendicular to the longitudinal direction are defined along the plane;
an omnidirectional rotating module, disposed at a front end of the bottom shell:

a top housing unit, arranged above the bottom shell for an user's palm placed thereon, having a front part rotatably connected a top portion of the omnidirectional rotating module, and a rear part opposite to the front part along the longitudinal direction; and an angle adjusting device, opposite to the omnidirectional rotating module along the longitudinal direction, disposed between the top housing unit and the bottom shell, wherein the angle adjusting device includes:

an accommodating housing fixed on the bottom shell;

a linking module having a frame portion and a plurality legs extended downwardly from a bottom edge of the frame portion, wherein the frame portion is disposed in the accommodating housing in swingable manner along the longitudinal direction;

a pitching unit having a thread tube fixed in the frame portion of the linking module, and a liftable erective rod extending into the linking module in a rotatable manner along the erective direction, wherein the liftable erective rod has a thread portion screwed to the thread tube;

wherein a top end of the erective rod is rotatably connected to the rear part of the top housing unit and exposed outside the top housing unit;

thereby when the erective rod is raised or lowered relative to the bottom shell by rotating the top end thereof, the rear end of the top housing unit is uplifted or lowered to adjust a pitching angle of the top housing unit; and a rolling unit, having a guiding slider grasped by the legs of the linking module under the thread tube, and a lateral rod extending into the accommodating housing along the transverse direction, wherein the guiding slider has a thread portion formed at a central part thereof, wherein the lateral rod has a thread portion screwed to the thread portion of the guiding slider to move the legs of the linking module;

wherein the lateral rod has a head portion exposed outside the accommodating housing;

thereby when the head portion of the lateral rod is rotated to move the lateral rod along the transverse direction forward or reward relative to the accommodating housing, the legs of the linking module are moved along the transverse direction by the guiding slider screwed with the lateral rod so that the linking module and the erective rod are swung along the longitudinal direction, and the top end of the erective rod moves the rear part of the top housing unit along the transverse direction to adjust a rolling angle of the top housing unit.

2. The input device with adjustable holding angle of claim 1, wherein the top housing unit forms a cylindrical portion communicated with a top surface thereof, and the top end of the erective rod is located in the cylindrical portion.

3. The input device with adjustable holding angle of claim 1, wherein the omnidirectional rotating module includes:
a supporting rod having a ball end; and
an assembling unit rotationally connected to the top end of the supporting rod and the top housing unit.

4. The input device with adjustable holding angle of claim 3, wherein the top housing unit includes a upper shell and a lower shell connected to the upper shell, wherein the ball end of the supporting rod passes through the lower shell, the assembling unit is rotationally connected to the top end of the supporting rod and the lower shell.

5. The input device with adjustable holding angle of claim 3, further comprising a controlling module disposed on the assembling unit.

6. The input device with adjustable holding angle of claim 1, wherein the frame portion of the linking module has a pair of pivotal axles oppositely extended from two opposite sides of the frame portion, the pitching unit rotationally disposed in the frame portion, wherein the accommodating housing has a base housing and a top cover covered on the base housing, the base housing formed a pair of pivotal holes on a top edged thereof to receive the pair of pivotal axles respectively.

7. The input device with adjustable holding angle of claim 6, wherein the guiding slider of the rolling unit forms at least one track portion, the base housing of the accommodating housing forms at least one rail corresponding to the at least one track portion, the at least one track portion is slidably disposed on the at least one rail.

8. The input device with adjustable holding angle of claim 6, wherein the angle adjusting device has a pair of side blockers protruded upwardly from the base housing, wherein a distance between the pair of side blockers is larger than a width of the guiding slider, the guiding slider is movably disposed between the pair of side blockers, the lateral rod passed through the pair of side blockers.

9. The input device with adjustable holding angle of claim 6, wherein the base housing of the accommodating housing forms a mounting hole therethrough along the transverse direction, the mounting hole aligned to the thread portion of the guiding slider, the lateral rod passed through the mounting hole.

10. The input device with adjustable holding angle of claim 1, wherein the pitching unit has a limited clip fixed to the erective rod.

11. An angle adjusting device, used to adjust a pitching angle and a rolling angle of a device, wherein the device having a bottom shell and a top housing unit arranged above the bottom shell, wherein the bottom shell defines a longitudinal direction along a plane and a transverse direction along the plane perpendicular to the longitudinal direction, an erective direction perpendicular to the plane, the angle adjusting device comprising:

an accommodating housing;

a linking module having a frame portion and a plurality legs extended downwardly from a bottom edge of the frame portion, wherein the frame portion is disposed in the accommodating housing in swingable manner along the longitudinal direction;

a pitching unit having a thread tube fixed in the frame portion of the linking module and an erective rod extending into the linking module in a rotatable manner along the erective direction, wherein the liftable erective rod has a thread portion screwed to the thread tube, wherein a top end of the erective rod is exposed outside the accommodating housing and connected to the rear part of the top housing unit;

thereby the erective rod is able to be raised or lowered relative to the bottom shell by rotating the top end thereof; and a rolling unit, having a guiding slider grasped by the legs of the linking module under the thread tube, and a lateral rod extending into the accommodating housing in a rotatable manner along the transverse direction;

wherein the guiding slider has a thread portion formed at a central part thereof, wherein the lateral rod has a thread portion screwed to the thread portion of the guiding slider to move the legs of the linking module, wherein the lateral rod has a head portion exposed outside the accommodating housing;

thereby when the head portion of the lateral rod is rotated to move the lateral rod along the transverse direction forward or reward relative to the accommodating housing, the legs of the linking module are moved along the transverse direction by the guiding slider screwed with the lateral rod so that the linking module and the erective rod are swung along the longitudinal direction, and the top end of the erective rod accordingly moves the rear part of the top housing unit along the transverse direction the rear part of the top housing unit to adjust a rolling angle of the top housing unit.

12. The angle adjusting device of claim 11, wherein the frame portion of the linking module has a pair of pivotal axles oppositely extended from two opposite sides of the frame portion, the pitching unit rotationally disposed in the frame portion, wherein the accommodating housing has a base housing and a top cover covered on the base housing, the base housing formed a pair of pivotal holes on a top edged thereof to receive the pair of pivotal axles respectively.

13. The angle adjusting device of claim 11, wherein the pitching unit has at least one limited clip fixed to the erective rod, the rolling unit has at least one limited clip fixed to the lateral rod.

14. The angle adjusting device of claim 11, wherein the guiding slider of the rolling unit forms at least one track portion, the base housing of the accommodating housing forms at least one rail corresponding to the at least one track portion, the at least one track portion is slidably disposed on the at least one rail.

15. The angle adjusting device of claim 11, further comprising a pair of side blockers protruded upwardly from the base housing, wherein a distance between the pair of side blockers is larger than a width of the guiding slider, the guiding slider is movably disposed between the pair of side blockers, the lateral rod passed through the pair of side blockers.

16. The angle adjusting device of claim 12, wherein the base housing of the accommodating housing forms a mounting hole therethrough along the transverse direction, the mounting hole aligned to the thread portion of the guiding slider, the lateral rod passed through the mounting hole.

* * * * *